United States Patent [19]

Jackson

[11] Patent Number: 5,336,475

[45] Date of Patent: * Aug. 9, 1994

[54] PROCESS FOR CHROMIUM REMOVAL USING AN INORGANIC SULFUR COMPOUND

[75] Inventor: John R. Jackson, Wilmington, N.C.

[73] Assignee: Huron Tech Corp., Delco, N.C.

[ * ] Notice: The portion of the term of this patent subsequent to Oct. 19, 2010 has been disclaimed.

[21] Appl. No.: 99,092

[22] Filed: Jul. 28, 1993

Related U.S. Application Data

[63] Continuation-in-part of Ser. No. 872,110, Apr. 22, 1992, Pat. No. 5,254,321, which is a continuation-in-part of Ser. No. 759,656, Sep. 13, 1991, abandoned, which is a continuation of Ser. No. 611,796, Nov. 19, 1990, abandoned.

[51] Int. Cl.$^5$ .................. C10G 37/02; B01D 21/00
[52] U.S. Cl. .................. 423/55; 423/607; 423/57; 210/720; 210/724
[58] Field of Search .................. 423/55, 57, 607; 210/720, 724

[56] References Cited

U.S. PATENT DOCUMENTS

| | | | |
|---|---|---|---|
| 3,961,029 | 6/1976 | Senoo | 423/54 |
| 4,259,297 | 3/1981 | Kaczur et al. | 423/55 |
| 4,338,200 | 7/1982 | Zeijlstra | 210/724 |
| 4,376,099 | 3/1983 | Yamamoto et al. | 423/54 |
| 5,093,089 | 3/1992 | Alford et al. | 423/55 |
| 5,254,321 | 10/1993 | Jackson | 423/35 |

FOREIGN PATENT DOCUMENTS

| | | | |
|---|---|---|---|
| 49-027057 | 3/1974 | Japan | 210/DIG. 30 |
| 55-119493 | 9/1980 | Japan | C02F 1/70 |

*Primary Examiner*—Paul Lieberman
*Assistant Examiner*—Patricia C. Hailey
*Attorney, Agent, or Firm*—Andrew E. Pierce

[57] ABSTRACT

A method has been devised for removing chromium ions from a chromium ion containing liquid and recovering chromium oxide in a usable form by (a) adjusting the temperature of the liquid to an optimal temperature to maximize reduction and simultaneous precipitation of the chromium oxide; (b) adding a reducing agent to the liquid to form a mixture, where the reducing agent is at least one inorganic sulfur compound selected from the group of sulfur compounds where sulfur is in the 4+ oxidation state; and (c) adjusting the pH of the mixture to a pH between 5 and 7; (d) optionally further adjusting the pH of the mixture to a pH between above 7 to 12; and (e) separating the chromium from the mixture.

7 Claims, No Drawings

PROCESS FOR CHROMIUM REMOVAL USING AN INORGANIC SULFUR COMPOUND

REFERENCE TO RELATED APPLICATIONS

The present invention is a continuation-in-part of U.S. patent application Ser. No. 07/872,110, filed Apr. 22, 1992 now U.S. Pat. No. 5,254,321 which is a continuation-in-part of U.S. patent application Ser. No. 07/759,656 filed Sep. 13, 1991 now abandoned which is a continuation of U.S. patent application Ser. No. 07/611,796 filed Nov. 13, 1990, now abandoned.

BACKGROUND OF THE INVENTION

The present invention concerns a process for removing chromium from chromium containing liquids. In particular, it concerns removing chromium from aqueous alkali metal or alkaline earth metal sulfate solutions. More particularly, it concerns the removal of alkali metal dichromates from aqueous solutions of alkali metal sulfates by reacting said solutions with inorganic sulfur containing compounds. Most particularly, the present invention is concerned with the removal of sodium dichromate from sodium sulfate solutions.

Sodium sulfate is produced as a by-product in certain industrial processes. When it is contaminated with chromium because of exposure to chromium containing catalysts or otherwise, it is desirable to remove the chromium prior to use of the sodium sulfate, for instance, in the glass or textile industry or as a component of a detergent.

Kaczur et al., U.S. Pat. No. 4,259,297, discloses a multistep process for removing hexavalent chromium from impure aqueous alkali metal chlorate solutions. The pH of the impure aqueous solution is adjusted in a first step to a first intermediate pH in the range from about 9 to about 13 before mixing with the reducing chemical. An inorganic sulfur compound is then added. Then, in a second intermediate pH adjustment step in which the pH is adjusted from about 2 to about 4, the inorganic sulfur compound reduces the chromium to trivalent and divalent chromium. Finally, in a third intermediate pH adjustment step, the pH is adjusted from about 6 to about 8 and the reduced chromium is precipitated as the hydroxide.

Japanese Patent 119493 (1980) discloses a multistep method of removing low levels of chromium (i.e., 0.5 to 50 ppm) from reconstituted chlorate solutions from crystallizers. In this multistep process, hexavalent chromium is reduced by adding sulfite at a pH of from 3 to 6. The amount of sulfite added must satisfy a complex equation which is a function of pH and concentrations. The patent then states that the pH is adjusted from 9 to 11 to precipitate the chromium as hydroxide, but no details are provided as to how this can be accomplished.

Both of the above-described references produce chromium hydroxides which are well known to be difficult to filter. Kaczur discloses an expensive and awkward multistep solid-liquid separation process employing two centrifuging stages and two filtration stages. Japanese Patent 119493 does not address the solid-liquid separation problem. No commercial process exists employing either of these two processes.

U.S. Pat. No. 4,376,099 to Yamamoto et al. disclose in column 2, lines 3-9 the formation of a precipitate of hydrous chromic oxide subsequent to the acidification of a chlorate cell liquor containing hexavalent chromium ions by passing the chlorate cell liquor through an anion exchange resin bed. There is no indication of the use of a sulfur compound under neutral or acidic conditions as a reducing agent which is used to treat a chromium ion containing aqueous liquid so as to precipitate chromium oxide.

Japanese Patent 9027057, Teikoku Piston Ring Company, discloses in the abstract a process for the treatment of waste water containing hexavalent chromium ions so as to remove the hexavalent chromium by treatment with sulfur dioxide in a gas-liquid contactor. The abstract further discloses the treatment of waste water having a pH of 6.6 and containing 98 parts per million of hexavalent chromium by adjustment of the pH to less than 4.2 with 10 percent sulfuric acid and, thereafter, treatment with 99.96 percent sulfur dioxide at 15 degrees centigrade in a counter-current packed column. The hexavalent chromium remaining in the treated waste water after neutralization with 20 percent sodium hydroxide was 0.05 parts per million. There is no indication that the method used to separate the hexavalent chromium subsequent to reaction with sulfur dioxide involves the removal of chromium as solid particles of chromium oxide.

In the present invention, there has been discovered a set of conditions which allow the chromium to be simultaneously reduced and precipitated as an easily filtered metal oxide in a single stage process. Because of the process conditions of the present invention, solid-liquid separation can be accomplished on a full scale basis in a single filtration step without the use of clarifiers or centrifuges.

The present invention offers many advantages: (1) There is no release of noxious by-products such as sulfur or chlorine based gases which are characteristics of most other chromium precipitation processes. (2). The sulfur based reducing agents are readily available and, when used in the alkaline solution form, are safe and easy to store and handle without the release of $SO_2$. (3) There are no by-product reaction contaminants in the chromium free sulfate product. (4) The resulting chromium precipitate, which is mainly chromium oxide, is more easily filtered than the gelatinous chromium hydroxide precipitates produced by the prior art processes, and filtering can be done inexpensively in a single stage with a filter without the use of a centrifuge. The chromium oxide precipitate collects on the filter as a dense filter cake. In applications where the chromium is to be disposed of or taken to another site for reprocessing having the chromium sludge in the form of a dense filter cake minimizes the total volume of hazardous chemical which has to be handled. (5) The precipitate is in such a form as to be easily converted into a usable form, unlike prior art processes which do not yield chromium in a usable form. (6) There are no flocculating agents or by-product reaction contaminants such as elemental sulfur in the precipitated chromium sludge which would require further processing before the sludge is reused. (7) Unlike prior art processes which utilize several pH adjustment steps from extremely alkaline to extremely acidic for the reduction and precipitation of chromium, the present invention involves a pH in the acid range which is optionally followed by one pH adjustment to the alkaline range. The present invention allows essentially 100% of the chromium from a sulfate sludge product to be safely and inexpensively removed and recycled without the generation of by-product sulfur or chlorine based gases characteristic of prior art processes.

SUMMARY OF THE INVENTION

There are several objects of the present invention, including the following: (1) To remove chromium from an alkali metal or alkaline earth metal sulfate containing product by precipitation and separation. (2) To remove chromium from various effluents emanating from plants, such as chromium plants, sodium bichromate production plants, by separating the precipitated chromium from the purified solution, and conversion of the chromium containing residue to a usable product. (3) Treatment of leachants from hazardous waste sites to precipitate the chromium, separation of the residue from the purified filtrate, followed by conversion of the chromium containing residue into a useful product. In this case, other metal ions may also precipitate with the chromium and may be separated by known processes such as selective precipitation or electro separation.

In one variation, a process for removing chromium from a chromium containing liquid is disclosed which comprises:

(a) adjusting the temperature of the liquid to an optimal temperature to maximize reduction and simultaneous precipitation of the chromium;

(b) adding a reducing agent to the liquid to form a mixture, wherein the reducing agent is at least one inorganic sulfur compound selected from the group of sulfur compounds where sulfur is in the 4+ oxidation state;

(c) adjusting the pH of the mixture to a pH between 5 and 7 to simultaneously reduce and precipitate an easily filterable chromium oxide precipitate;

(d) optionally, further adjusting the pH of the mixture to a pH between above 7 to 12; and (e) separating the chromium oxide from the mixture.

Further objects of the present invention will become apparent to those skilled in the art upon a study of the following specification and appended claims.

The present invention is useful in treating liquids containing from 10 to 10,000 ppm of chromium ions, especially from 500 to 1,000 ppm. The present invention can be utilized in removing chromium from liquids such as waste water, plating solutions, brine, or any aqueous solution. The present invention can be utilized in treating suspensions, slurries, dispersions, and flowable sludges containing chromium or any aqueous dispersion.

The invention is described in terms of an aqueous sodium sulfate solution although any other alkali metal sulfate or alkaline earth metal sulfate or chromium containing aqueous liquid may be substituted with equivalent results.

As used herein, the term "liquid" is defined to include solutions, suspensions, dispersions, sludges and emulsions. The process can be utilized to treat any waste stream containing chromium.

Chromium is defined to include chromium compounds present as ionic species in solution or as solid material suspended in a liquid, especially including the di-, tri- and hexa-valent forms.

Generally, the chromium containing liquids or sludges are treated for removal of chromium ions at a temperature of about 56° C. to about 100° C., preferably, about 70° to about 95° C.

By a process of trial and error experimentation, and using the above information on specific conditions as a guide, optimum temperature conditions for maximum removal of the chromium can be determined for other specific At temperatures lower than the preferred range, all of the chromium At temperatures lower than the preferred range, all of the chromium will be reduced, but longer retention times will be required for the chromium to precipitate and solid-liquid separation will be more difficult.

The reducing agent can reduce the chromium from the hexavalent state to the trivalent or divalent state. The reducing agent can react with other heavy metals that might be present. The presence of other heavy metals may affect the amount of reducing agent required.

Reducing agents can be selected from inorganic sulfur compounds in which sulfur is in the 4+ oxidation state. Examples include alkali metal and alkaline earth metal sulfites, bisulfites, metabisulfites, sulfur dioxide or mixtures thereof. These reducing agents can be added as an alkaline solution so that they can be easily handled and mixed with liquids or sludges solutions without the generation of dangerous gases. As is known in the art, alkaline solutions can be easily made by mixing a given material with alkaline materials such as sodium hydroxide.

To simplify the description, the reducing agent will be hereafter referred to as sodium sulfite or sulfite.

The amount of reducing agent utilized is an amount sufficient to accomplish the desired reduction and simultaneously precipitate chromium. The sulfite solution is mixed with an aqueous sulfate solution or sludge in a 2:1 to 15:1 molar ratio of sulfite ion to bichromate ion, preferably 9:1 to 13:1, and most preferably 12:1. The molar ratio would be the same for other reducing agents if they were added in the alkaline form.

The reaction between sulfite and hexavalent chromium produces byproduct $OH^-$ ions which raise the pH of the mixture. Accordingly, the reaction pH is controlled to between 5 and 7, and preferably between 5.0 and 5.5, by the addition of any strong base or acid as needed. The acid or base can be utilized provided it does not adversely affect the reactions taking place. NaOH or $H_2SO_4$ is preferred. Without being bound by theory, the chromium is reduced from the hexavalent to the trivalent form and precipitates as an oxide in the same step;

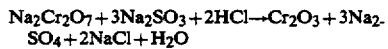

$$Na_2Cr_2O_7 + 3Na_2SO_3 + 2HCl \rightarrow Cr_2O_3 + 3Na_2SO_4 + 2NaCl + H_2O$$

The chromium oxide produced by this method is easier to filter than chromium hydroxide produced in prior art processes. Reaction time is 5 to 90 minutes, preferably 15 to 30 minutes. It is also possible for the chromium to be reduced from the hexavalent to the divalent form. A pH higher than the above stated range will require longer reaction times and may result in incomplete reduction or precipitation of chromium as the hydroxide. A pH lower than the stated range may result in an incomplete reaction of sulfite with chromium.

The precipitated chromium oxide settles and leaves a top layer of clear, chromium free liquid which can be decanted off. The solid-liquid separation can be done with any solid liquid separation method, such as a filter, a clarifier, or a centrifuge. Other prior art processes recommend using a centrifuge, but this has the disadvantage of resulting in a large recycle stream and the centrifuge usually must be followed by a polishing filter. The preferred solid-liquid separation in accordance with the present invention utilizes a ceramic cartridge or teflon woven cloth type filter. The solid-liquid separation can be done in one step to yield a clear, essentially chromium ion free sulfate solution. Other types of filters can be used. The ceramic filter has lower capital and maintenance costs than a centrifuge.

At least one filter can be used in the solid-liquid separation step. Preferably two filters are used, allowing one to be backwashed while the other is in service; these two filters would alternate approximately every 30 minutes.

From the above it is seen that removal of chromium is dependent on controlling several reaction parameters i.e., the temperature, the pH, and the amount of sulfite added.

The following examples further illustrate the present invention:

EXAMPLE 1

A sample of an aqueous solution of sodium sulfate at a concentration of 27 percent by weight containing a chromium ion concentration of about 500 to about 1000 parts per million was treated for removal of chromium ion by the addition of sodium sulfite which was added at a molar concentration of 12:1 based upon the amount of chromium ion concentration in the sodium sulfate aqueous solution. In the process for the removal of the chromium present in the sodium sulfate solution, the above mixture was heated to 90°–92° C. for a period of 30 minutes at a pH of 5–5.5 to precipitate the chromium as the oxide and filtered. The resulting filtrate was clear and showed no discoloration as a result of the presence of chromium ions. Upon analysis, the resulting filtrate was found to have a chromium ion concentration of 0.02 parts per million.

EXAMPLES 2–5

The process of Example 1 is repeated substituting for sodium sulfite, sodium bisulfite, sodium metabisulfite, sulfur dioxide, and an equal parts mixture of sodium bisulfite, sodium metabisulfite, and sulfur dioxide. Similar results are obtained as are disclosed in Example 1.

Further variations and modifications of the process of the invention will become apparent to those skilled in this art from the foregoing and are intended to be encompassed by the claims appended hereto.

What is claimed is:

1. A process for the removal of chromium from an aqueous liquid or sludge, said process comprising:
   A) adding to a first, aqueous liquid or sludge a reducing agent selected from the group consisting of an inorganic sulfur containing compound in which sulfur is present in the 4+ oxidation state, said inorganic sulfur containing compound being added in an amount required to react with said chromium in said first, aqueous liquid or sludge,
   B) reacting at a temperature of about 56° about 100° C. and a pH of about 5 to about 7 in order to precipitate a chromium compound comprising substantially chromium oxide, and
   C) separating said chromium oxide from said first aqueous liquid or sludge to obtain a second, aqueous liquid or sludge characterized as essentially chromium ion free.

2. The process of claim 1 wherein said first aqueous liquid or sludge comprises an alkali metal sulfate or an alkaline earth metal sulfate and chromium in the divalent, trivalent, or hexavalent state,
   wherein said reducing agent is a sulfur containing compound selected from the group consisting of an alkali metal sulfite, bisulfite, or metabisulphite; an alkaline earth metal sulfite, bisulfite, or metabisulfite; sulfur dioxide; and mixtures thereof, and
   wherein said chromium oxide is separated from said aqueous solution by filtration.

3. The process of claim 2 wherein said aqueous, alkali metal or alkaline earth metal sulfate is present in the amount of up to about 35% by weight, said chromium is present as chromium ions, and said process is conducted at a reaction temperature of about 70° C. to about 95° C. and a pH of about 5.0 to about 5.5.

4. The process of claim 2 wherein said aqueous alkali metal sulfate is sodium sulfate.

5. The process of claim 3 wherein said sodium sulfite is present in a molar ratio of sulfite ions to said chromium ions, present as bichromate ions, of 2:1 to 15:1.

6. The process of claim 3 wherein said reducing agent is sodium sulfite or a mixture of sodium sulfite and sodium bisulfite.

7. The process of claim 3 wherein said reducing agent is sulfur dioxide which is present in an aqueous solution of sodium hydroxide.

* * * * *

UNITED STATES PATENT AND TRADEMARK OFFICE
CERTIFICATE OF CORRECTION

PATENT NO.   : 5,336,475
DATED        : August 9, 1994
INVENTOR(S)  : John Robert Jackson It is certified that error appears in the above-indentified patent and that said Letters Patent is hereby corrected as shown below:

Column 4, line 3, "specific" should read --"specific chromium containing liquids or sludges by a person skilled in this art." --

Column 4, lines 4 and 5 should be deleted.

Signed and Sealed this

Sixteenth Day of May, 1995

Attest:

BRUCE LEHMAN

*Attesting Officer*            *Commissioner of Patents and Trademarks*